(12) United States Patent
Chen

(10) Patent No.: US 7,223,315 B2
(45) Date of Patent: May 29, 2007

(54) METHOD AND APPARATUS FOR HEATING PLASTICS BY MEANS OF LASER BEAMS

(75) Inventor: Jie Wei Chen, Alpnach Dorf (CH)

(73) Assignee: Leister Process Technologies, Sarnen (CH)

( * ) Notice: Subject to any disclaimer, the term of this patent is extended or adjusted under 35 U.S.C. 154(b) by 0 days.

(21) Appl. No.: 10/960,717

(22) Filed: Oct. 6, 2004

(65) Prior Publication Data

US 2005/0098260 A1 May 12, 2005

(30) Foreign Application Priority Data

Oct. 21, 2003 (EP) .................................. 03024188

(51) Int. Cl.
 *B29C 65/16* (2006.01)
(52) U.S. Cl. ............................... 156/272.8; 156/379.6; 359/641; 219/121.64; 219/121.78
(58) Field of Classification Search ............. 156/272.8, 156/309.6, 379.6, 380.9; 219/121.6, 121.61, 219/121.63, 121.64, 121.65, 121.66, 121.75, 219/121.78, 121.79; 359/558, 641
See application file for complete search history.

(56) References Cited

U.S. PATENT DOCUMENTS

| 4,997,250 A * | 3/1991 | Ortiz, Jr. ..................... 385/33 |
| 5,500,506 A * | 3/1996 | Lawson .................. 219/121.67 |
| 6,207,925 B1 | 3/2001 | Kendall |
| 2003/0098295 A1* | 5/2003 | Kawamoto et al. .... 219/121.66 |

FOREIGN PATENT DOCUMENTS

| DE | 4319742 A1 * | 12/1994 |
| DE | 102 54 917 | 6/2003 |
| JP | 07329669 | 12/1995 |

OTHER PUBLICATIONS

Derwent abstract for DE 4319742 A1.*
Babel Fish Machine English Translation for DE 4319742 A1.*

* cited by examiner

*Primary Examiner*—Richard Crispino
*Assistant Examiner*—Daniel McNally
(74) *Attorney, Agent, or Firm*—Bachman & LaPointe, P.C.

(57) ABSTRACT

Method and apparatus for heating plastic by laser beams with the aid of a number of laser points on the focal plane, the laser points being produced by an optical arrangement with the aid of a multiple wedge plate. The arrangement can be integrated in a processing head.

5 Claims, 7 Drawing Sheets

METHOD AND APPARATUS FOR HEATING PLASTICS BY MEANS OF LASER BEAMS

BACKGROUND OF THE INVENTION

The present invention relates to a method for heating plastics by means of laser points from a laser beam on a focal plane, preferably for welding plastics using the laser transmission method. The invention also relates to an apparatus for heating plastics by means of laser beams with the aid of a processing head for accommodating devices for shaping the laser beam.

In order to weld plastics by means of laser beams, it is known in the so-called transmission welding method for a first plastic part that is transparent to the laser beam to be heated at the contact surface with a second plastic part that is absorbent for the laser beam, and for these parts to be welded to one another under the action of pressure. In order to achieve the desired speed at which the laser is moved over the plastic components and, nevertheless, to ensure good welding qualities, it is necessary to install in the beam path a preheating process that ensures that the heating is performed in various steps in a way known per se. It is known for this purpose to use a number of laser beams that are guided pointwise one after the other to bring the plastics material up to a preheating temperature in a first step, and up to the welding temperature in a second step.

The welding of tarpaulins made from coated fabrics, films and sealing webs requires a test structure for testing the strength of the weld seam. When the welding is carried out by means of laser beams, it is likewise necessary to produce an appropriate test structure during the welding process. This normally happens through the production of double welding lines.

In order to split light, it is known to undertake beam splitting such that a number of light outputs from a light source are produced in different directions which have the same beam quality. The light intensity at different light outputs is determined by optical properties of the beam splitter. The space requirement and the costs are, however, relatively high, since each optical output requires all the lens components in order to shape the beam appropriately and to collimate it. This method cannot be applied, above all, when an easy spatial splitting of the light is involved.

It is therefore the object of the present invention to propose a possibility of being able to produce a plurality of laser points on a focal plane while observing good handling, flexibility and also, as far as possible, the use of optical fibers.

SUMMARY OF THE INVENTION

The object is achieved according to the invention by providing a method for heating plastic with the aid of a number of laser points from a laser beam on a focal plane preferably for the purpose of welding plastics using the laser transmission method, wherein the laser beam is collimated with the aid of a first lens, the laser beam is then split by means of a multiple wedge plate with a number of wedges that corresponds to the number of the laser points to be produced, which wedges are offset by a prescribed angle, and the laser beam portions are fed by continuing to be collimated with different propagation directions to a converging lens; and the laser points are produced on a focal plane by the converging lens. The invention further includes an apparatus wherein the processing head has a ball that is transparent to the laser beam and is arranged downstream of the converging lens and mounted rotatably in the processing head.

By means of the method according to the invention and of the apparatus, the laser beam, which is emitted from a point laser source that is available both as an optical fiber and as a freely radiating radiation, is firstly expanded by a lens combination and collimated. Splitting governed by the number of laser points to be produced is undertaken in the collimated beam path. Use is made for this purpose of a plate, denoted as a multiple wedge plate, which has planes that correspond to the number of laser points to be produced and are inclined at a slight angle to the surface perpendicular to the optical axis. The wedges are basically deflecting prisms with a small angle. In the case of more than two laser points, this multiple wedge plate has a flat structure that resembles a pyramid and has a plurality of tapering planes that are inclined at the prescribed angle. The multiple wedge plate is centered in the beam path, although it is also possible to implement different light intensities at different points by means of a displacement relative to the optical axis.

The invention therefore offers the possibility of implementing minimum spatial splitting of the laser beam within an optical system. It is easy to adjust the distance of the splitting onto the focal plane. This solution can be integrated in a processing head, and therefore has a minimum overall size and enjoys full flexibility of movement. Since only one optical component is responsible for splitting the light, it is possible here to switch optically between single, double or multiple radiation. The split light beams run, as it were, along the same optical axis, and so the geometrical arrangement can be implemented with minimum adjustment.

In accordance with a preferred design, the separated laser beams downstream of the converging lens are coupled into a ball, preferably made from glass, that is transparent to the laser beam, and are guided appropriately over the focal plane during movement of the ball.

In order to produce parallel zigzag welding lines, such as are required for welding films, in particular, in accordance with a further design of the invention laser points are produced via two deflecting elements that can be moved transverse to the beam path. The deflecting elements are preferably designed in a fashion deflecting in opposite directions by a prescribed angle, and are brought into the beam path alternately. By accommodating the arrangement in a processing head, in particular in combination with a transparent ball running on the plastics material to be welded, it is possible to implement an element that is easy to handle and with the aid of which it is possible to heat and weld along virtually any desired contours.

BRIEF DESCRIPTION OF THE DRAWINGS

The invention is explained below in more detail with the aid of exemplary embodiments. In the drawing.

DETAILED DESCRIPTION

Figure 1:
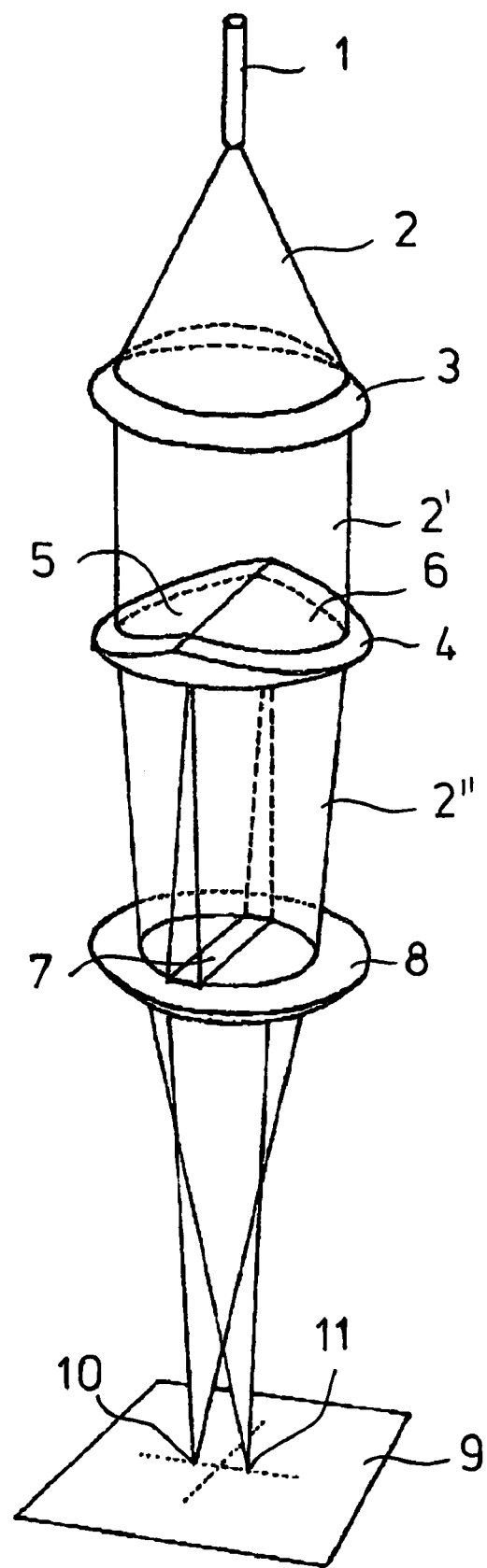
FIG. 1 shows a diagram of an optical arrangement for producing two light points on a focal plane.

FIG. 1 shows an optical fiber 1 from which a laser beam 2 emerges. A lens 3 collimates the laser beam, which then strikes a double wedge plate 4. As is to be gathered from the figure, the wedges 5, 6 are arranged in such a way that the plane facing the collimated laser beam 2' drops outward from the middle, and therefore the laser beam is slightly deflected toward the central optical axis. This is illustrated in the figure by the overlapping region 7 on the subsequent lens 8. The double wedge plate acts like two prisms arranged one against another which slightly deflect the laser beam along the light propagation direction. The radiation is split into two parts 2", but still remains collimated, although it runs on in two different propagation directions. The converging lens 8 refocuses the two split rays onto a focal plane 9, where they are formed as two light points 10, 11. The wedge angle and the optical properties of the converging lens determine the distance between the two laser points 10, 11. The two laser points 10, 11 can also be rotated symmetrically about the optical axis by rotating the double wedge plate 4.

The beam geometry on the focal plane is no longer quasi-Gaussian in such a case: rather, two semicircles are formed, but these can still be regarded as a normal point. This beam shape has no essential influence on a welding process for joining plastic parts or films.

Figure 4A:
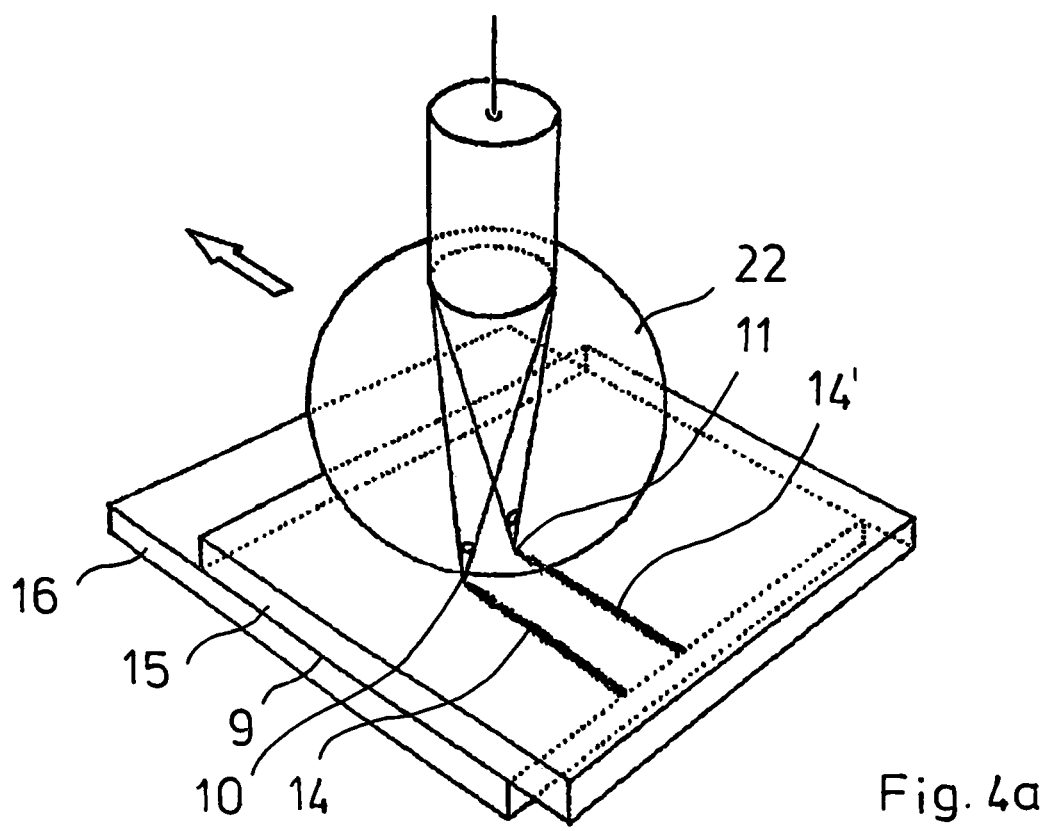
FIG. 4 shows diagrams of the welding of two plastics materials, with different movement directions of the laser points, the laser points being arranged next to one another (FIG. 4a) or one after another (FIG. 4b) with reference to the movement direction.
Figure 5:
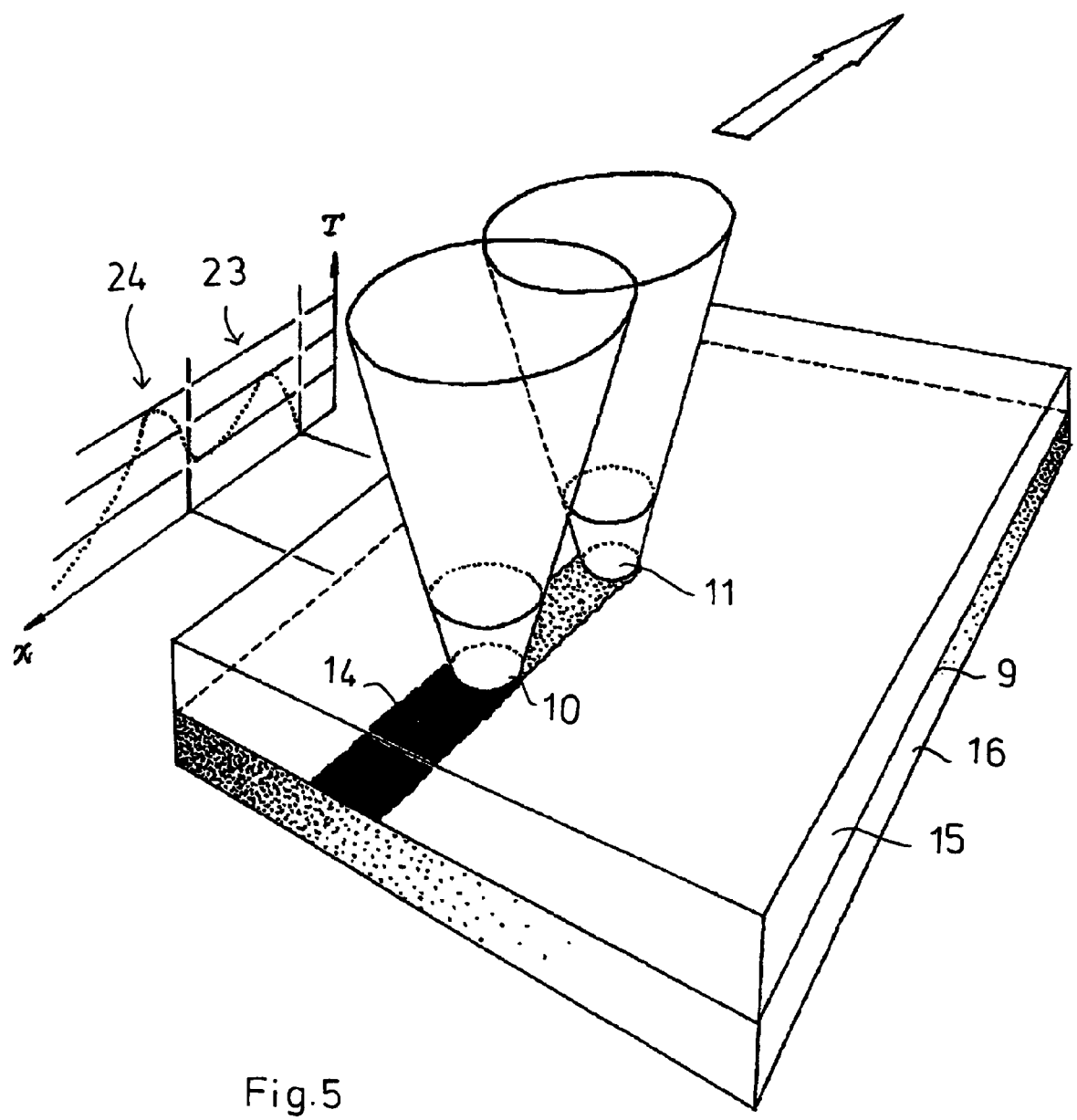
FIG. 5 shows a diagram of two laser points moved one after another in the case of the transmission welding method, and also shows the temperature distribution over the length of the path.
Figure 6:
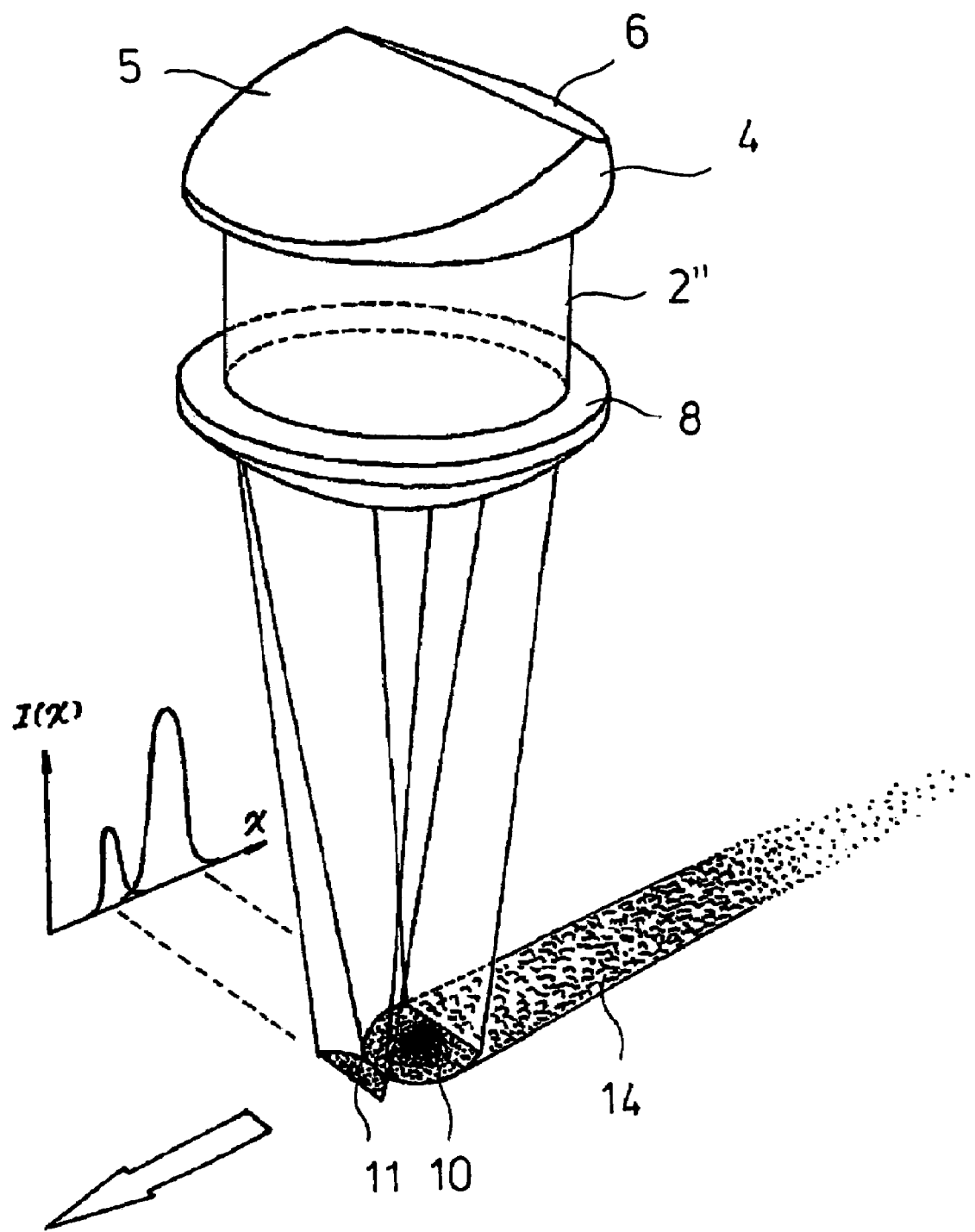
FIG. 6 shows a part of the arrangement with a double wedge plate having planes with different degrees of inclination, together with an illustration of the intensity in the focal plane.

The spatial splitting also determines the light intensity (compare FIG. 6). For a double welding line such as is illustrated in FIG. 4a, the similarity of the two laser points is decisive for the welding operation. As shown in FIG. 6, the decentering of the double wedge plate 4 leads to an asymmetric intensity distribution of the light. This property can be used for contour welding processes with an integrated reheating operation, as are illustrated in FIGS. 4a, 5 and 6, for example. The distance between the two laser points and the ratio of the dosage of energy between the preheating and welding can be optimized in terms of the welding result.

Figure 3A:
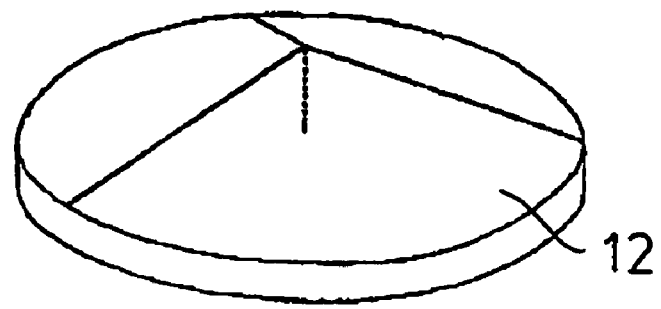
FIG. 3 shows various exemplary refinements of multiple wedge plates.
Figure 3B:
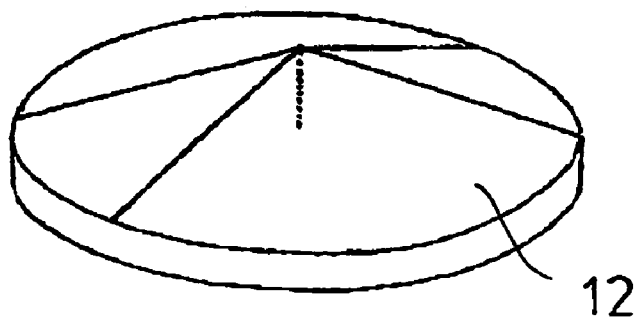
Figure 3C:
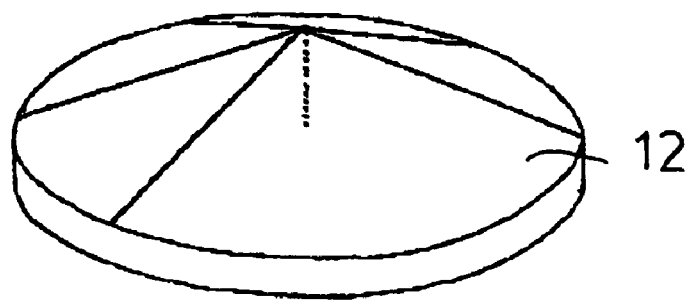

A ring formed from two laser points can be produced by rotating the double wedge plate. The number of beams can be correspondingly enlarged by enlarging the number of wedges in relation to a multiple wedge plate, as in FIG. 3a with three wedges 12, in FIG. 3b with four wedges 12, in FIG. 3c with five wedges 12 or even more.

Figure 2:
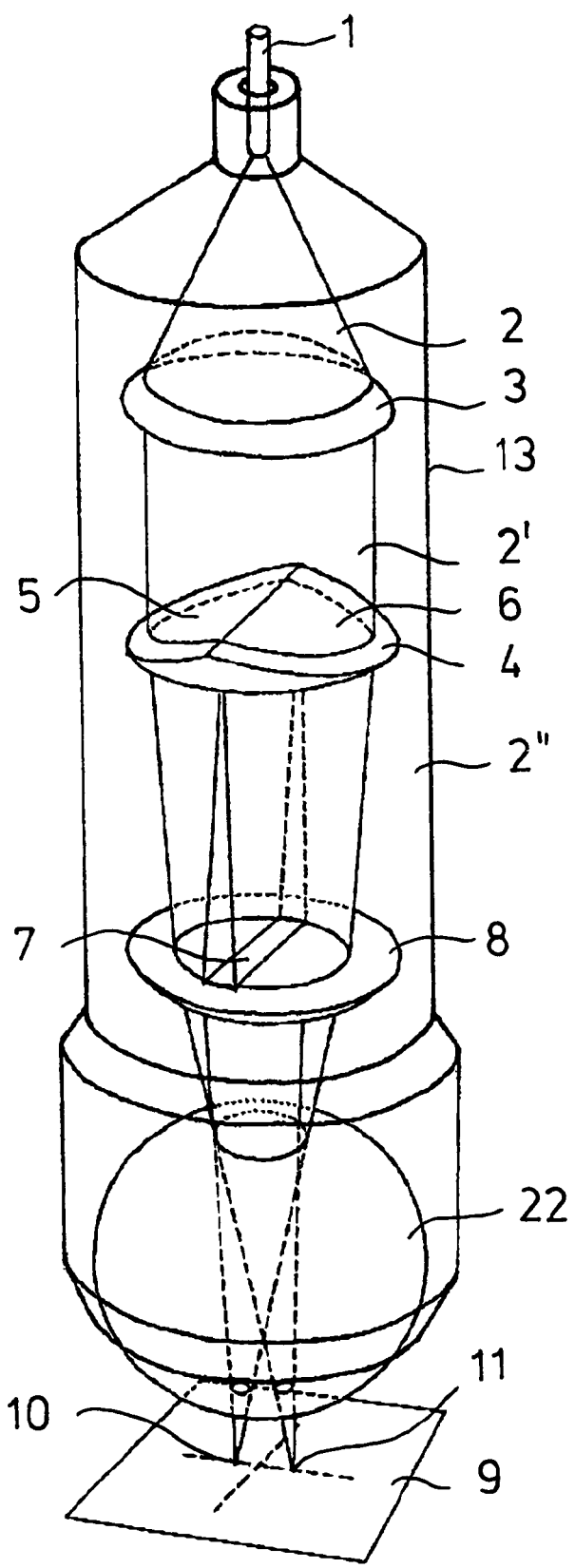
FIG. 2 shows the integration of the arrangement of FIG. 1 in a processing head with a glass ball as pressing and guiding element for the laser beam.

All the arrangements can be integrated in a processing head 13, as shown by way of example in FIG. 2. Also located in the processing head 13 at the other end is a rotatably mounted ball 22, which is made from a transparent material such as glass or plastic, for example, and directs the laser beam onto the focal plane 9. The pressing force required for the welding operation can be applied via the ball 22 at the instant of joining by hand or else machine.

Figure 4B:
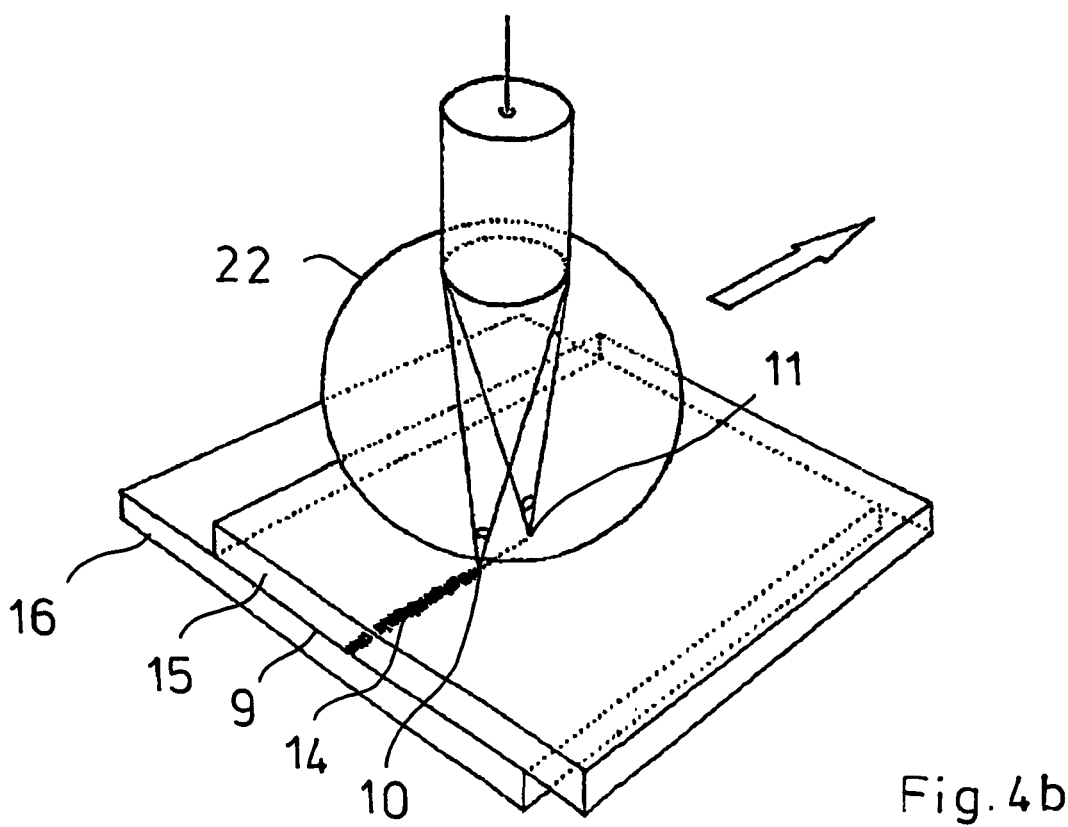

FIG. 4 shows diagrams of two possible variants for the welding operation. Thus, FIG. 4a shows two laser points 10, 11 that are moved parallel to one another in the direction of the arrow so as to form two parallel welding seams 14, 14'. This is necessary, in particular, when welding films with a test channel. FIG. 4b shows the arrangement of the two laser points 10, 11 that move one after another in the welding direction and produce only one welding seam 14. The optical arrangements illustrated in FIGS. 1 and 2 are indicated in both figures in principle only, for the sake of simplicity.

FIG. 5 shows a first workpiece 15, which is transparent to the laser beam, and, therebelow, a workpiece 16 which absorbs the laser beam and by means of which two laser points 10, 11 moving one after another in the welding direction are welded to one another. The light points 10, 11 are focused onto the contact surface between the two workpieces 15, 16, which thereby form the focal plane 9. The diagram also displayed shows the temperature in the region of the focal plane 9. It is to be seen that the overall process is composed of a preheating section 23 and of a welding section 24 along the path.

As already mentioned above, FIG. 6 illustrates a double wedge plate 4 with a larger wedge 5 and a smaller wedge 6 which correspondingly form a smaller light point 11 and a subsequent larger light point 10 on the focal plane 9. It is also possible thereby to implement preheating with subsequent welding in conjunction with movement in the welding direction. The light intensity is also shown in principle in this figure as a function of distance.

Figure 7:
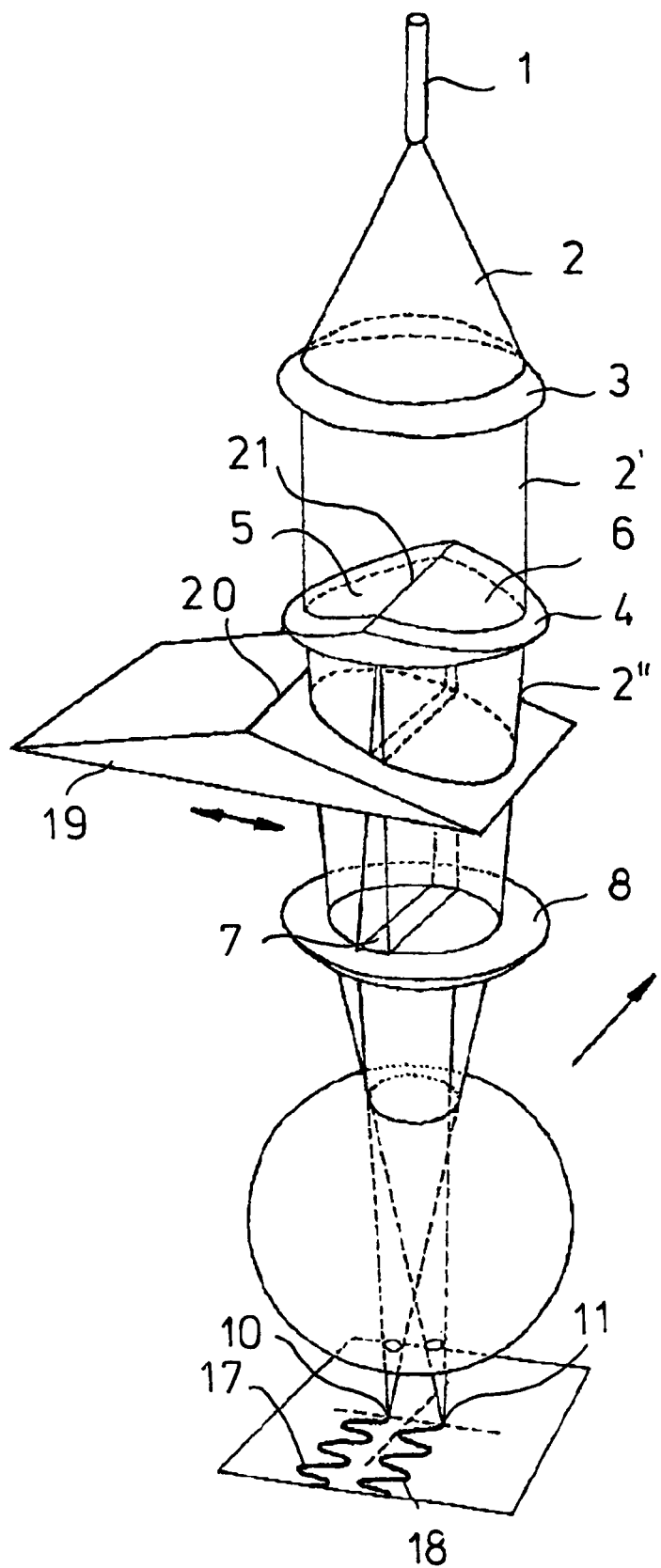
FIG. 7 shows an arrangement for producing parallel zigzag tracks of the laser points in the focal plane.

FIG. 7 shows an arrangement for producing two parallel zigzag welding contours 17, 18 that are produced by the two laser points 10, 11 moving in the welding direction. For this purpose, downstream of the double wedge plate 4 a further double wedge 19 is moved to and fro transverse to the optical axis in the beam path of the laser beam 2. The double wedge 19 is to be arranged here such that the dividing line 20 runs parallel to the dividing line 21 between the wedges 5 and 6 of the double wedge plate 4.

In the exemplary embodiment, the two double wedges face one another with their thick sides. It is equally well possible for them also to face one another with their narrow sides. The movement of the double wedge 19 to and fro can be implemented by means of a motor and an appropriate mechanism in a simple and known way.

The invention claimed is:

1. A method for welding plastic comprising the steps of:
providing a laser beam source for producing a laser beam;
locating a lens downstream of the last beam source for collimating the laser beam;
splitting the collimated laser beam into a plurality of beams by means of a multiple wedge plate comprising a plurality of wedges which correspond to a desired number of laser points to be produced, wherein the wedges are offset from horizontal at a desired angle;
varying the direction of the plurality of beams treading out of the multiple wedge plate by a movable deflecting element located downstream of the splitting means comprising at least one deflecting wedge, wherein the plurality of beams are fed through the deflecting wedge, said deflection wedge running with its contact edges parallel to contact edges of the multiple wedge plate splitting the laser beam;
moving the deflecting element continuously to and fro transversely to the optical axis of the beam path of the plurality of laser beams for directing the plurality of laser beams simultaneously to various points on a focal plane of plastics to be welded;
locating a converging lens downstream of the movable deflecting element, wherein the plurality of beams deflected by the deflecting wedge of the deflecting element are fed through the converging lens and continue to be collimated thereby to produce a plurality of laser points on a focal plane of plastic to be welded; and providing a movable transparent ball downstream of the converging lens wherein the plurality of laser beams are coupled and guided over the focal plane during movement of the ball for welding the plastic.

2. The method according to claim 1, including controlling the laser beam intensity by varying the size of the splitting wedges.

3. The method according to claim 1, wherein the deflecting element comprises two wedges formed on either side of an axis at a desired angle from horizontal.

4. An apparatus for welding plastic comprises:

means for producing a laser beam;

lens means downstream of the means for producing for collimating the laser beam;

means for splitting the collimated laser beam into a plurality of beams comprising a plurality of wedges which corresponds to the number of laser points to be produced, wherein the wedges are offset from horizontal at a desired angle;

means for varying the direction of the plurality of beams generated by the splitting means, comprising a deflecting element located downstream of the splitting means in the beam path of the plurality of laser beams having at least one deflecting wedge, said deflecting wedge running with its contact edges parallel to contact edges of the multiple wedge plate splitting the laser beam;

means for moving the two deflecting elements continuously to and fro transversely to the optical axis of the beam path of the plurality of laser beams for directing the plurality of laser beams simultaneously to various points on a focal plane of plastics to be welded;

converging lens means downstream of the deflecting element for producing a plurality of laser points on the focal plane; and a transparent ball which is transparent to the laser beam arranged downstream of the converging lens means for directing the laser beam toward the focal plane for welding the plastic.

5. The apparatus as claimed in claim 4, wherein the transparent ball is mounted rotatably in a processing head.

* * * * *